United States Patent [19]

Kluger

[11] 4,250,980

[45] Feb. 17, 1981

[54] DRUM BRAKE ADJUSTER

[75] Inventor: Michael A. Kluger, South Bend, Ind.

[73] Assignee: The Bendix Corporation, Southfield, Mich.

[21] Appl. No.: 10,880

[22] Filed: Feb. 9, 1979

[51] Int. Cl.³ .............................................. F16D 65/56

[52] U.S. Cl. ........................ 188/79.5 P; 188/196 BA; 188/250 A; 188/250 B; 192/111 A

[58] Field of Search .................. 188/79.5 R, 79.5 GE, 188/79.5 K, 79.5 P, 79.5 S, 79.5 SC, 196 BA, 202, 250 A, 250 B; 192/111 A

[56] References Cited

U.S. PATENT DOCUMENTS

| | | | |
|---|---|---|---|
| 3,017,962 | 1/1962 | Ingres | 188/196 BA X |
| 3,195,690 | 7/1965 | Johannesen et al. | 188/250 A X |
| 3,556,262 | 1/1971 | Dombeck | 188/79.5 GL |
| 4,101,011 | 7/1978 | Burnett | 188/216 X |

FOREIGN PATENT DOCUMENTS 1341549 12/1973 United Kingdom .

*Primary Examiner*—George E. A. Halvosa

*Attorney, Agent, or Firm*—Paul David Schoenle; Ken C. Decker

[57] ABSTRACT

A drum brake assembly includes a pair of brake shoes which are movable from a non-braking position to a braking position in engagement with a rotatable member. A hydraulic actuator is engageable with the pair of brake shoes to move the latter to the braking position and a strut extends between the pair of brake shoes to substantially define the non-braking position. The strut comprises a unitary sleeve with a bore for receiving projections extending from the pair of brake shoes. The bore is stepped with a threaded portion and a tapered diameter portion. The threaded portion engages one of the projections on one of the brake shoes such that rotation of the unitary sleeve by a pawl causes the unitary sleeve and other brake shoe to move away from the one brake shoe. The unitary sleeve is radially expanded at an intermediate location to define a ratchet wheel in engagement with the pawl. Moreover, a parking lever is engageable with the unitary sleeve to move the pair of brake shoes to a braking position in response to movement of the parking lever.

3 Claims, 2 Drawing Figures

DRUM BRAKE ADJUSTER

BACKGROUND OF THE INVENTION

A drum brake adjuster, such as ilustrated in U.S. Pat. No. 4,101,011, utilizes several parts to form an extendible assembly capable of adjusting a non-braking position for a pair of brake shoes. A pawl is pivoted in response to the movement of the pair of brake shoes and is engaged with a ratchet wheel such that the extendible assembly is extended when the movement of the pair of brake shoes is above a predetermined value. As a result the pair of brake shoes are maintained in close proximity to a rotatable member to define a preferred running clearance with the rotatable member.

The extendible assembly is formed from a nut, a threaded stem and a socket so that rotation of the threaded stem relative to the nut will extend the length of the extendible assembly.

SUMMARY OF THE INVENTION

The present invention covers an improvement in a drum brake assembly wherein an automatic adjuster is provided to compensate for wear on a pair of brake shoes. The pair of brake shoes are engageable with a hydraulic actuator which is operable to move the pair of brake shoes from a non-braking position to a braking position. A strut comprising a single or unitary sleeve cooperates with the pair of brake shoes to substantially define the non-braking position and cooperates with a parking lever to effectuate a parking brake application. The unitary sleeve includes a stepped bore extending therethrough to define a small diameter portion having threads and a large tapered diameter portion opposite from the small diameter portion. The pair of brake shoes are provided with projections extending into the stepped bore such that one of the projections extending from one of the pair of brake shoes is threaded to mesh with the threaded small diameter portion of the stepped bore while the other projection slidably engages the large diameter portion.

The unitary sleeve is radially expanded at an intermediate location to define a ratchet wheel and a pawl is engageable with the ratchet wheel to impart rotation to the unitary sleeve when the movement of the pair of brake shoes from the non-braking position to the braking position is above a predetermined running clearance.

It is an object of the present invention to provide a unitary sleeve in a drum brake assembly which defines the non-braking position for a pair of brake shoes and also cooperates with the pair of brake shoes to adjust the non-braking position in response to wear of the pair of brake shoes. The unitary sleeve also cooperates with a parking lever to effectuate a parking brake application.

DETAILED DESCRIPTION

Figure 1:
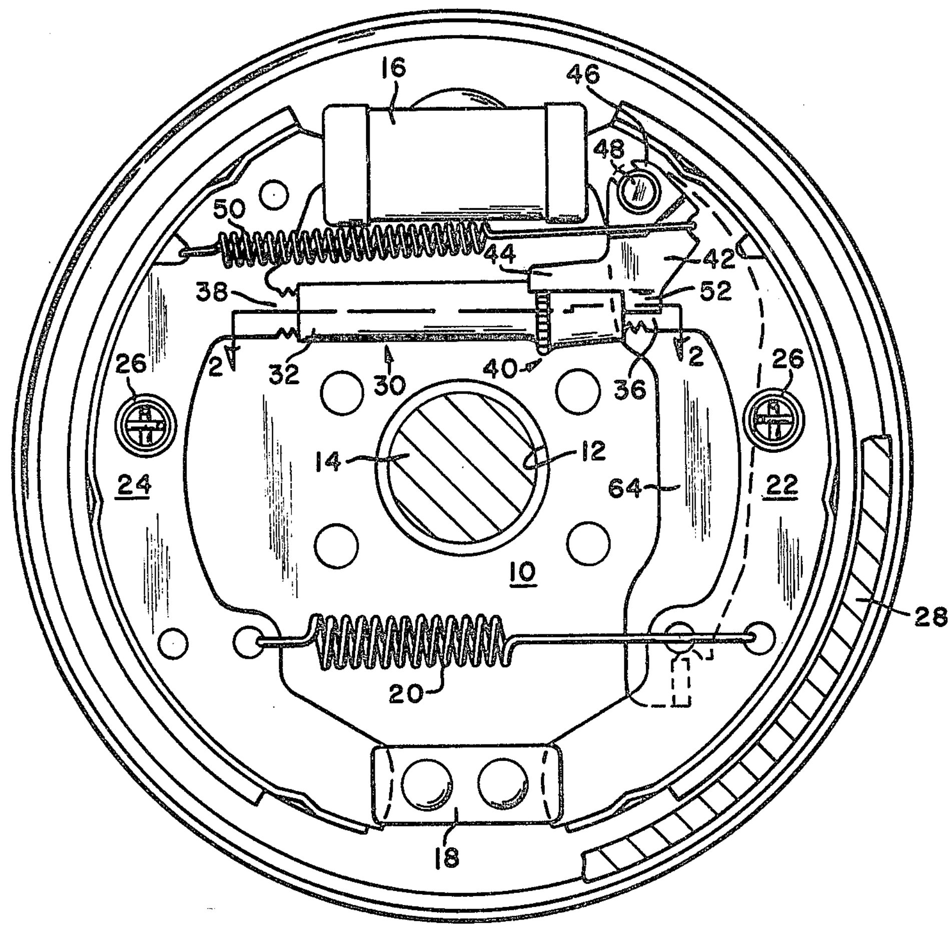
FIG. 1 is a front view of a drum brake assembly including the adjuster of the present invention.

The drum brake assembly of FIG. 1 includes a backing plate 10 with an opening 12 for receiving an axle shaft 14 of a vehicle. The backing plate 10 carries a hydraulic actuator 16 near the top and includes an anchor bracket 18 near the bottom. A spring 20 coooperates with a pair of brake shoes 22 and 24 to bias the same into engagement with the anchor bracket 18 while hold-down springs at 26 position the pair of brake shoes adjacent the backing plate 10. The hydraulic actuator 16 is engageable with the pair of brake shoes to move the latter from a non-braking position to a braking position in engagement with a rotatable member 28.

In accordance with the invention a strut 30 is engageable with the pair of brake shoes to substantially define the non-braking position. The strut comprises a unitary sleeve 32 with a bore 34 extending therethrough. The brake shoes are provided with projections 36 and 38 extending into the bore 34. The projections 36 and 38 are shown in FIG. 1 as integral portions of each respective brake shoe; however, it is possible to provide projections which attach to each brake shoe. The unitary sleeve 32 defines a ratchet wheel 40 and a pawl 42 includes a first arm 44 engageable with the ratchet wheel to impart rotation to the unitary sleeve in a manner hereinafter described.

The pawl 42 includes a second arm 46 which is pivotally coupled to the brake shoes 22 via pin 48 and a resilient member 50 extends from the brake shoe 24 to the pawl 42 to maintain a third arm 52 of the pawl in abutment with an end of the unitary sleeve 32. When the pair of brake shoes are expanded into engagement with the drum 28, the pin 48 moves the first arm 46 to the right while the unitary sleeve 32 is moved to the left with brake shoe 24. The resilient member 50 causes the third arm 52 to remain in abutment with the end of the unitary sleeve 32 so that it also moves to the left. As a result the pawl 42 is rotated in a clockwise direction. If the brake shoes move through an excessive distance greater than a predetermined clearance with the rotatable member, the pawl 42 will be rotated so as to index the pawl first arm 44 to a successive tooth on the ratchet wheel 40.

Figure 2:
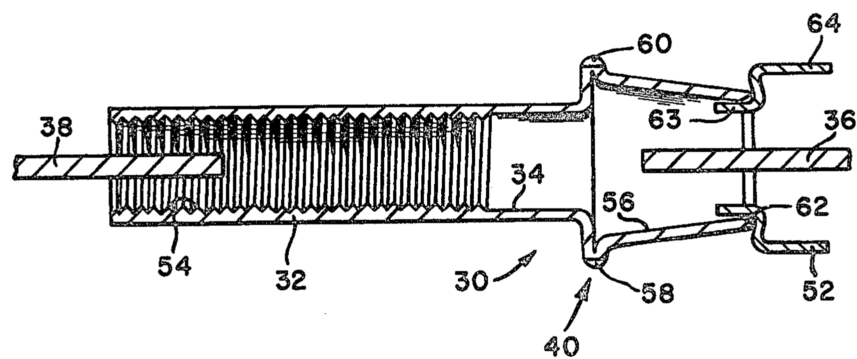
FIG. 2 is a longitudinal cross-sectional view of the strut shown in FIG. 1.

Turning to FIG. 2, the strut 30 or unitary sleeve 32 is shown separate from the pair of brake shoes and in cross section. The bore 34 is stepped to define a small diameter portion 54 and a large tapered diameter portion 56. The small diameter portion 54 is threaded to mesh with the threads on projection 38. The pair of brake shoes are reversible so that the threads of diameter portion 54 are also capable of meshing with the threads of projection 36. The large tapered diameter portion 56 is dimensioned to form a sliding fit with the outer edge of the threads on projection 36 (or projection 38) so that the unitary sleeve 32 is movable relative to the projection 36 when the pair of brake shoes are moved to the braking position.

In order to provide the ratchet wheel 40 on the unitary sleeve 32 it is possible to form or bump the sleeve so as to radially expand a portion 58 at an intermediate location. Thereafter, the teeth 60 are formed in the expanded portion 58 to define the ratchet wheel 40. In addition, the end of the unitary sleeve 32 which abuts the pawl 42 may be tapered at 62 to catch the arm 52 when the resilient member 50 is coupled to the pawl 42 and the brake shoe 24. In addition a parking lever 64 may include a projection 63 extending into the tapered bore 56 so as to connect the parking lever 64 with the unitary sleeve. The projection 63 can be omitted if an abutment between the unitary sleeve 32 and the parking lever 64 is provided.

The optional parking lever 64 is pivotally secured to the pin 48 and is engageable with the end 62 of the unitary sleeve 32. If the parking lever is rotated clockwise about pin 48, the unitary sleeve 32 and brake shoe 24 are urged to the left while the pin 48 and brake shoe 22 are urged to the right in order to effectuate braking during a parking brake application.

In order to assemble the drum brake of FIG. 1, the unitary sleeve is screwed onto the brake shoe projection 38 so that the projection is advanced into the bore portion 54. Thereafter, the brake shoes 22 and 24 are juxtapositioned to the anchor bracket 18 and the hydraulic actuator so that the projection 36 is slidably inserted into the bore portion 56.

Although the unitary sleeve will rotate slightly in a counter-clockwise direction when the brake shoe 24 is expanded to the braking position, the clearance between the projection 36 and the large bore portion 56 is sufficient to permit a slight rotation of the unitary sleeve 32.

I claim:

1. In a drum brake assembly having a pair of brake shoes cooperating with a hydraulic actuator to move radially outwardly within a braking plane from a non braking position to a braking position, a strut cooperating with the pair of brake shoes to substantially define the non braking position, an adjustment pawl cooperating with the strut to impart rotation to the latter to vary the spacing between the pair of brake shoes, and a parking lever cooperating with the strut to move the pair of brake shoes to the braking position in response to a parking brake application characterized by said strut comprising a single integral sleeve engageable with said pair of brake shoes, said single integral sleeve defining a bore extending the length thereof to receive portions of said pair of brake shoes within said bore, the wall of said bore defining internal threads at one end which threadably engage one of said pair of brake shoe portions and the wall of said bore at the other end defining an enlarged diameter portion which receives the other brake shoe portion to permit movement of the latter within said enlarged diameter portion, said enlarged diameter portion also receiving a portion of said adjustment pawl and a portion of said parking lever to provide a pivotal connection between said adjustment and parking lever and said single integral sleeve, and said enlarged diameter portion also defining a tapered wall which slants away from said other brake shoe to permit rotation of said single integral sleeve relative to said other brake shoe within said braking plane during braking and said other brake shoe portion substantially remains disposed within said bore during said braking plane rotation of said single integral sleeve.

2. The drum brake assembly of claim 1 further characterized by said brake shoe portions comprising integrally formed projections which define threads thereon.

3. The drum brake assembly of claim 2 in which said pair of brake shoes are reversible.

* * * * *